United States Patent
Halverson

(12) 
(10) Patent No.: US 6,515,685 B1
(45) Date of Patent: Feb. 4, 2003

(54) METHOD AND APPARATUS FOR DYNAMICALLY CHANGING HOT SPOTS ON A DRAGGABLE WINDOWS CONTROL

(75) Inventor: Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,697

(22) Filed: Mar. 22, 2000

(51) Int. Cl.$^7$ .................................................. G06F 3/00

(52) U.S. Cl. ....................... 345/808; 345/163

(58) Field of Search ................................ 345/808, 648, 345/136, 137, 161, 840

(56) References Cited

PUBLICATIONS

Patent application Ser. No. 09/232,027 filed Jan. 15, 1999 entitled Touch Screen Region Assist for Hypertext Links (RO998–197) by Bates et al.

*Primary Examiner*—Cao H. Nguyen
(74) *Attorney, Agent, or Firm*—Joan Pennington

(57) ABSTRACT

Methods, apparatus and a computer program product are provided for dynamically changing hot spots on a draggable windows control. A size of a control is determined. The control size is compared with a predetermined minimum size. Responsive to the control size being less than the predetermined minimum size, top and bottom hot spots beyond ends of the control for stretch hot spots and on the control for move hot spot are calculated. Responsive to the control size being greater than or equal to the predetermined minimum size, a ratio for determining the top and bottom stretch hot spots is calculated. The hot spots are dynamically changed depending upon the size of the control.

19 Claims, 7 Drawing Sheets

METHOD AND APPARATUS FOR DYNAMICALLY CHANGING HOT SPOTS ON A DRAGGABLE WINDOWS CONTROL

FIELD OF THE INVENTION

The present invention relates generally to the data processing field, and more particularly, relates to a method, apparatus and computer program product for dynamically changing hot spots on a draggable windows control.

DESCRIPTION OF THE RELATED ART

Many windows applications have controls that can be directly manipulated with the mouse. These controls can often be clicked and dragged from its ends to make the control larger; or clicked and dragged in the middle to change the overall position of the control while keeping its original dimensions. If the control can be sized such that it is very small, often it can be difficult for the user to initiate both types of actions, stretching and repositioning.

It is desirable to enable the user to more easily manipulate a control. When the user passes the mouse over a control, the hot spots for the corresponding actions are analyzed. When a resize or reposition function is detected, a tool tip is surfaced or the cursor is manipulated to indicate which action can be initiated when the mouse is clicked and dragged. Users often encounter problems when resizing or repositioning a window due to various limitations. For example, when resizing or repositioning a window, it is often labor intensive for the user to put the mouse pointer on the desired hot spot for the corresponding action for window resizing or repositioning. This is especially difficult when the user has poor coordination or poor vision, a fast pointer speed, or a small hot spot.

A need exists for a mechanism for dynamically changing hot spots on a draggable windows control. A need exists for a way to easily resize and reposition windows that allows a user to more easily manipulate the control.

SUMMARY OF THE INVENTION

A principal object of the present invention is to provide a method, apparatus and computer program product for dynamically changing hot spots on a draggable windows control. Other important objects of the present invention are to provide such methods, apparatus and computer program product for dynamically changing hot spots on a draggable windows control substantially without negative effect; and that overcome many of the disadvantages of prior art arrangements.

In brief, methods, apparatus and a computer program product are provided for dynamically changing hot spots on a draggable windows control. A size of a control is determined. The control size is compared with a predetermined minimum size. Responsive to the control size being less than the predetermined minimum size, top and bottom hot spots beyond ends of the control for stretch hot spots and on the control for move hot spot are calculated. Responsive to the control size being greater than or equal to the predetermined minimum size, a ratio for determining the top and bottom stretch hot spots is calculated.

In accordance with features of the preferred embodiment, the hot spots are dynamically changed depending upon the size of the control.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
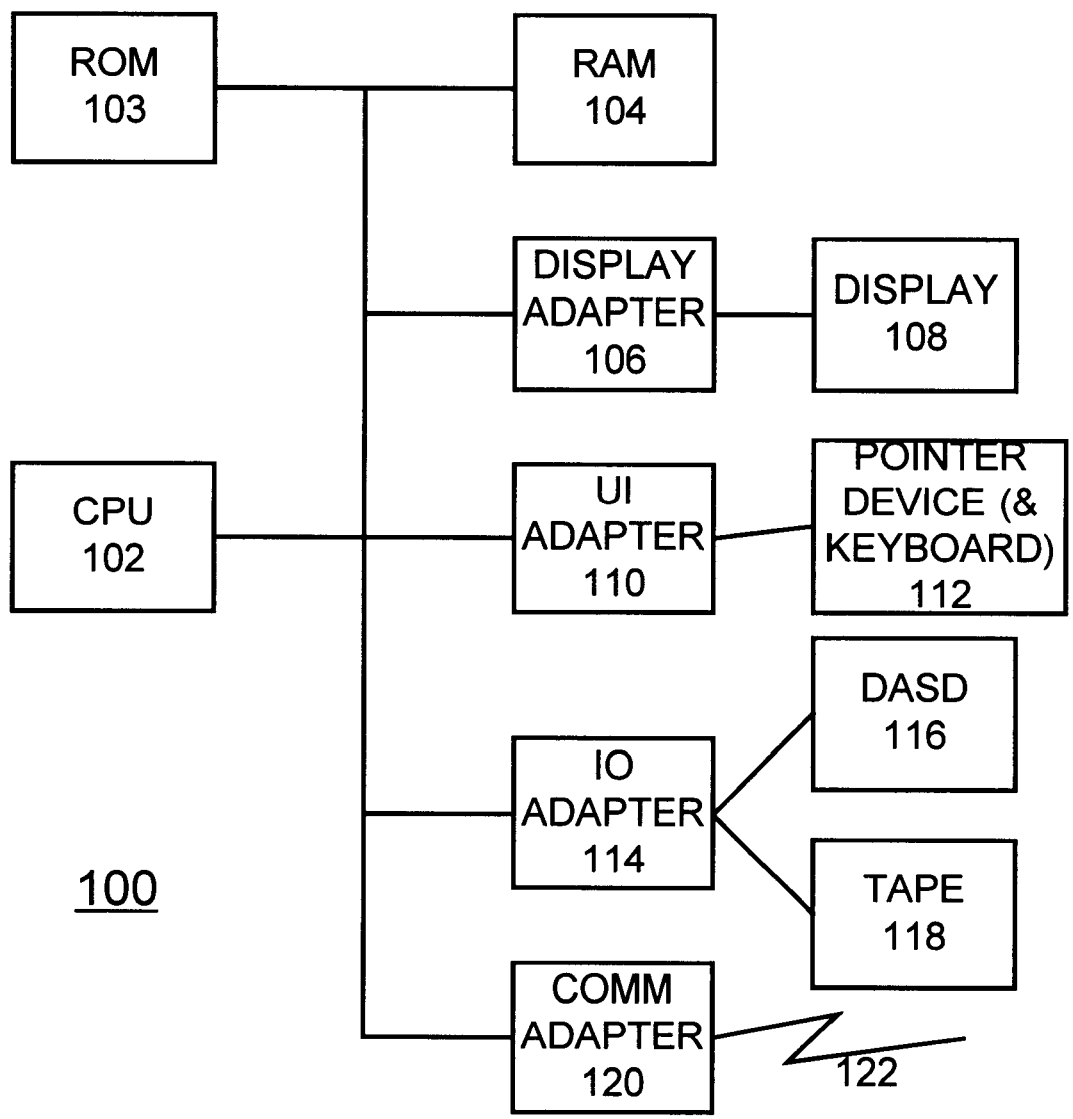
FIG. 1 is a block diagram representation illustrating a computer system for implementing methods for dynamically changing a hot spot on a draggable windows control in accordance with the preferred embodiment.

Having reference now to the drawings, in FIG. 1, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114, for example, connected to a direct access storage device (DASD) 116 and a tape unit 118. CPU 102 is connected to a communications adapter 120 providing a communications network connection function with a network 122.

Figure 2:
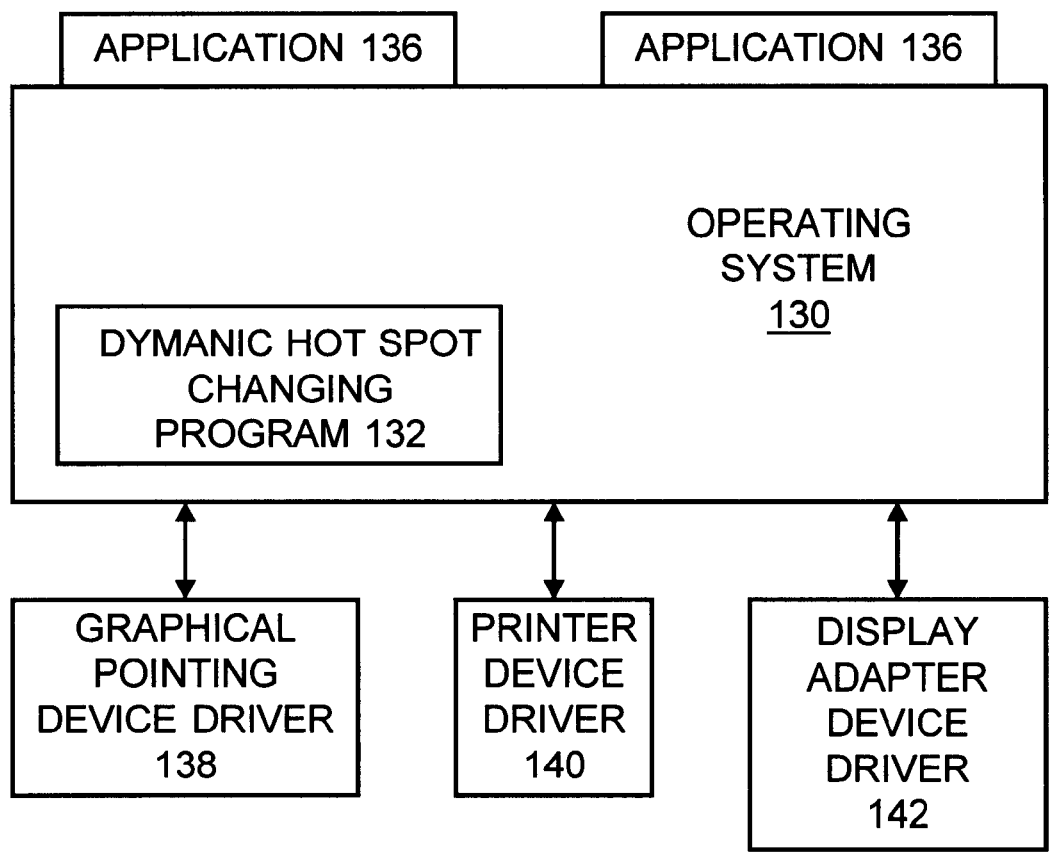
FIG. 2 is a block diagram representation illustrating an operating system of computer system of FIG. 1 for implementing methods for dynamically changing a hot spot on a draggable windows control in accordance with the preferred embodiment.

Referring to FIG. 2, the computer system 100 includes an operating system 130 and a dynamic hot spot changing program 132 of the preferred embodiment. Multiple applications 136 and multiple device drivers including a graphical pointing device driver 138, a printer device driver 140, and a display adapter device driver 142 are supported by the operating system 130.

Figure 3:
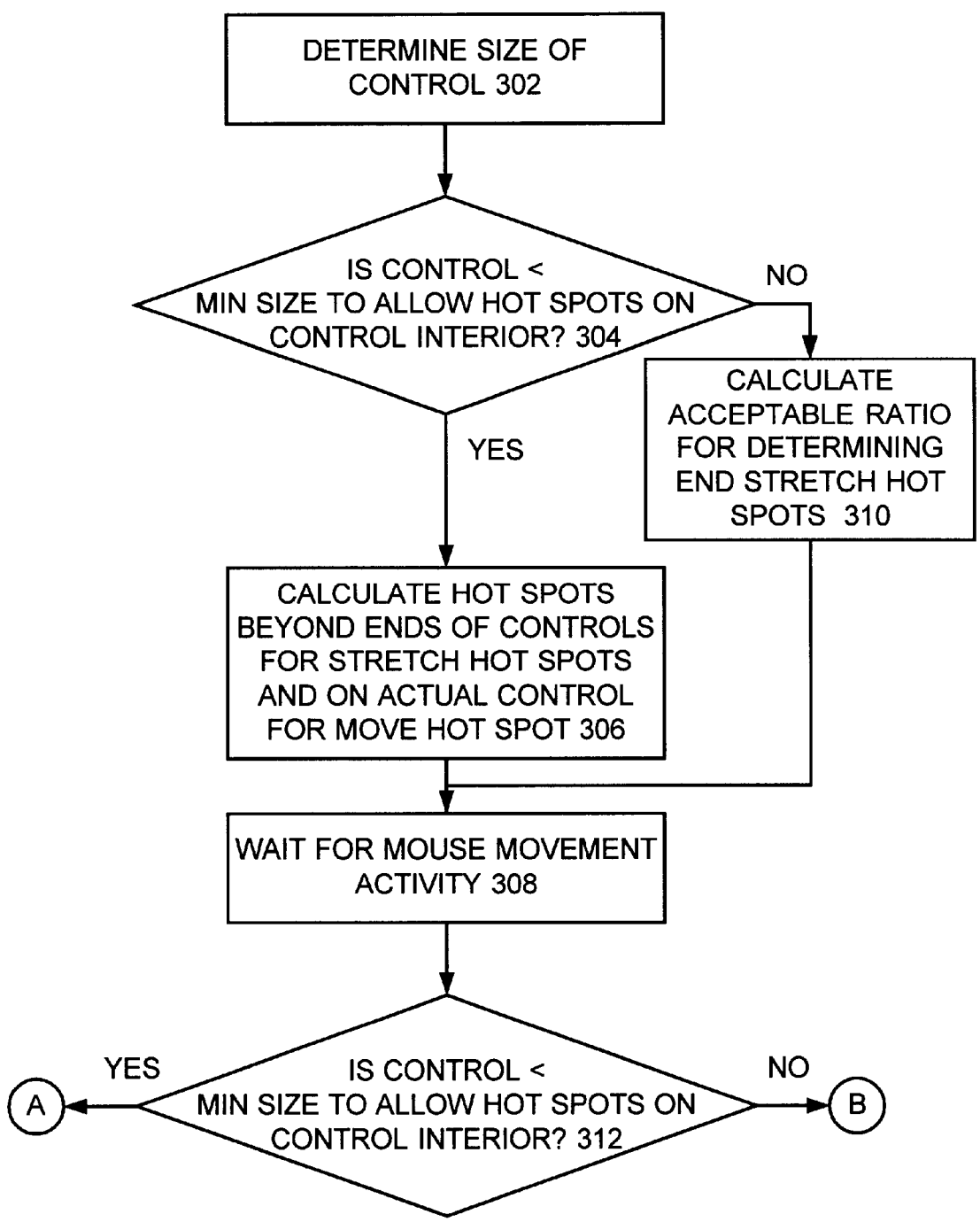
FIGS. 3, 4 and 5 are flow charts illustrating exemplary sequential steps for dynamically changing a hot spot on a draggable windows control in accordance with the preferred embodiment.
Figure 4:
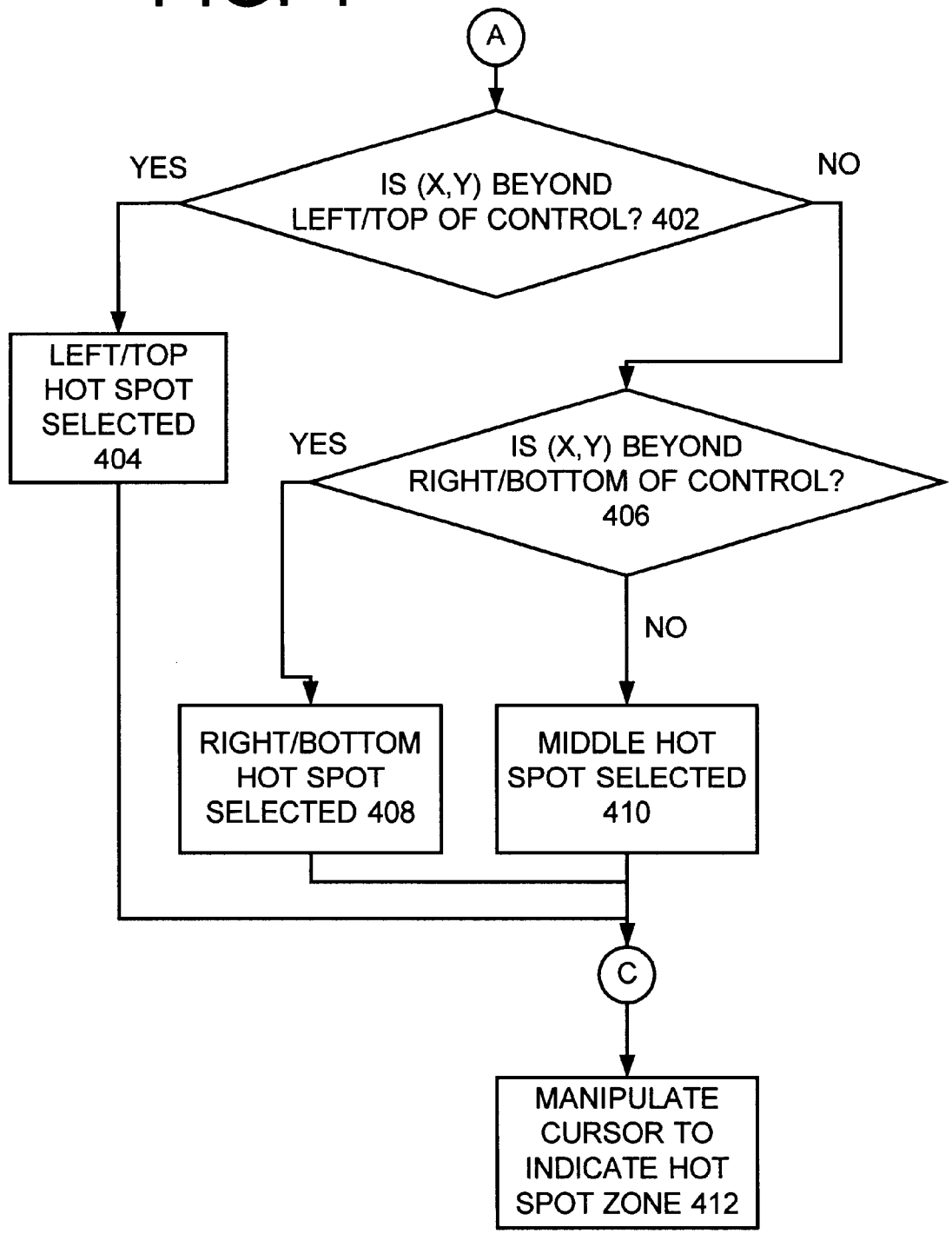
Figure 5:
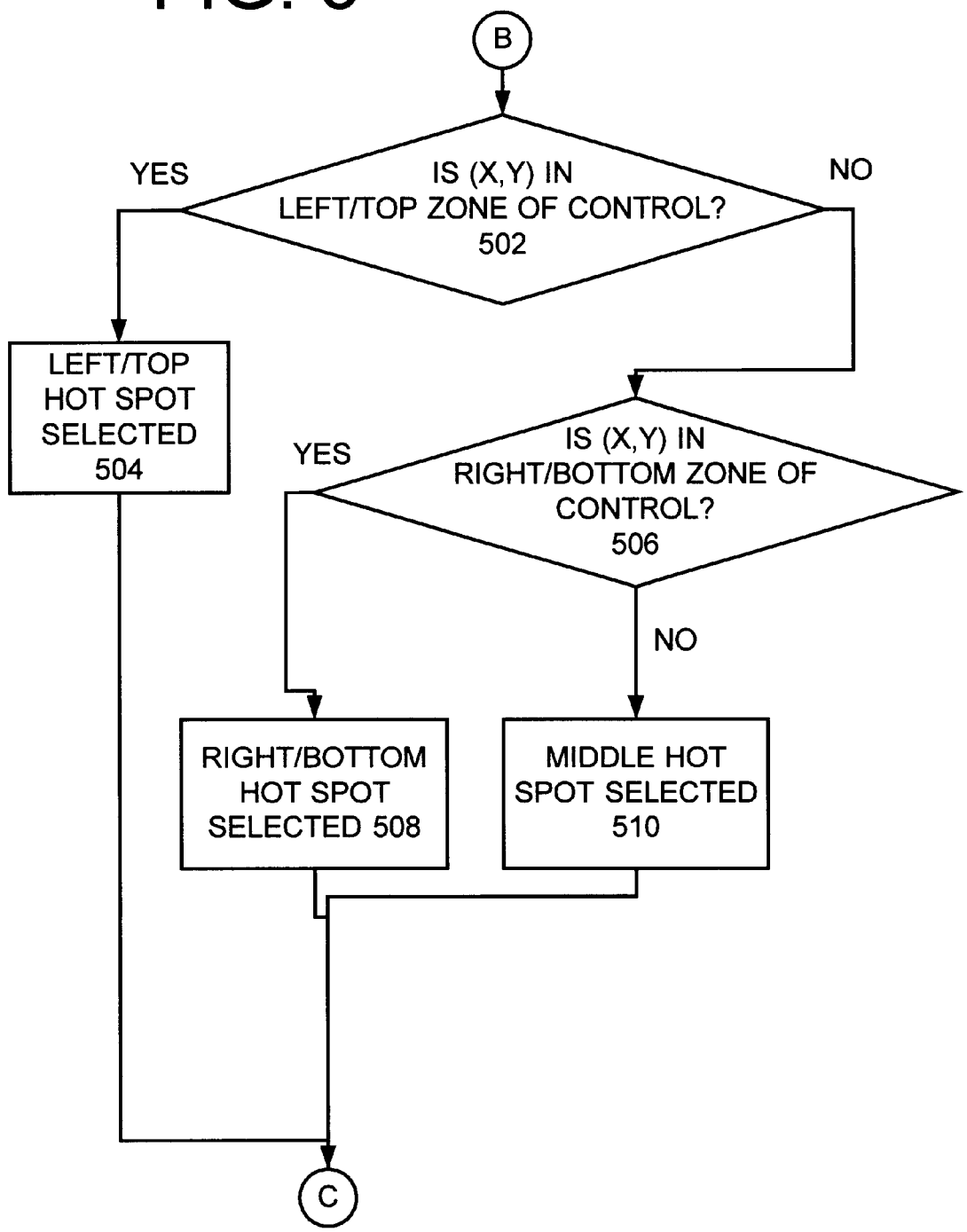

Central processor unit 102 is suitably programmed to execute the flow charts of FIGS. 3, 4, and 5 of the preferred embodiment. Computer 100 may be implemented using any suitable computer, such as an IBM personal computer running the OS/2® operating system.

In accordance with features of the preferred embodiment, the user is enabled to more easily manipulate a control. When the user passes the mouse over a control, the hot spots for the corresponding actions are analyzed. When a resize or reposition function is detected, a tool tip is surfaced or the cursor is manipulated to indicate which action can be initiated when the mouse is clicked and dragged. The control includes top and bottom hot spots for resizing and a middle hot spot for the reposition function. The hot spots are dynamically changed so that the user is enabled to more easily manipulate the control. For example, consider a control that is 200 pixels high and 10 pixels wide. Since the control is tall enough such that it is easy to distinguish the middle of the control versus the top and bottom of the control, the user is given more margin for error on the hot spots. For example, a top hot spot is defined to be 5 pixels above the actual top and 20 pixels below the actual top of the control. This allows the user to place the mouse near the top of the control and have it detected as a resize function of the top. Similarly, the bottom hot spot is defined to be 5 pixels below the actual bottom and 20 pixels above the actual bottom of the control. Anywhere between the top and bottom hot spots is defined as the middle hot spot and associated with a control reposition.

In accordance with features of the preferred embodiment, the hot spots are dynamically changed depending upon the size of the control. As the height of the control becomes larger, a more generous hot spot is defined; and as the height of the control becomes smaller, a more precise hot spot is defined. When the control is so small that it is difficult to distinguish top and bottom hot spots versus the middle hot spot, then the algorithm is changed. The mouse position must be above the actual top of the control for the top hot spot and the mouse position must be below the actual bottom of the control for the bottom hot spot. The user is allowed to position the mouse directly on the control or very close to the control for the middle hot spot.

Referring to FIGS. 3, 4 and 5 there are shown exemplary sequential steps for dynamically changing a hot spot on a draggable windows control in accordance with the preferred embodiment. In FIG. 3, the sequential steps begin with determining the size of a control as indicated in a block 302. Next it is determined whether the control is less than a minimum size to allow hot spots on the control interior as indicated in a decision block 304. When determined that the control is less than a minimum size to allow hot spots on the control interior at decision block 304, then calculating hot spots beyond ends of controls for stretch hot spot and on actual control for move hot spot is performed, dynamically changing the hot spots as indicated in a block 306. Then waiting for mouse movement activity is performed as indicated in a block 308. When determined that the control is not less than a minimum size to allow hot spots on the control interior at decision block 304, then calculating an acceptable ratio for determining end stretch hot spots is performed, dynamically changing the hot spots as indicated in a block 310. Then waiting for mouse movement activity is performed at block 308. Next it is determined whether the control is less than a minimum size to allow hot spots on the control interior as indicated in a decision block 312. When determined that the control is less than a minimum size to allow hot spots on the control interior at decision block 312, then the sequential operation continue following entry point A in FIG. 4. When determined that the control is not less than a minimum size to allow hot spots on the control interior at decision block 312, then the sequential operation continue following entry point B in FIG. 5.

Referring now to FIG. 4, it is determined whether the mouse position (X, Y) is beyond the left/top of the control as indicated in a decision block 402. When the position (X, Y) is beyond the left/top of the control, the left/top hot spot is selected as indicated in a block 404. When the position (X, Y) is beyond the left/top of the control, it is determined whether the position (X, Y) is beyond the right/bottom of the control as indicated in a decision block 406. When the position (X, Y) is beyond the right/bottom of the control, then the right/bottom hot spot is selected as indicated in a block 408. When the position (X, Y) is not beyond the right/bottom of the control, then the middle hot spot is selected as indicated in a block 410. After a hot spot is selected at block 404, 408 or 410, then the cursor is manipulated or a tool tip is surfaced to indicate a hot spot zone providing a visual indication for the user as indicated in a block 412.

Referring now to FIG. 5, it is determined whether the mouse position (X, Y) is in the left/top of the control as indicated in a decision block 502. When the position (X, Y) is in the left/top of the control, the left/top hot spot is selected as indicated in a block 504. When the position (X, Y) is in the left/top of the control, it is determined whether the position (X, Y) is in the right/bottom of the control as indicated in a decision block 506. When the position (X, Y) is in the right/bottom of the control, then the right/bottom hot spot is selected as indicated in a block 508. When the position (X, Y) is not in the right/bottom of the control, then the middle hot spot is selected as indicated in a block 510. After a hot spot is selected at block 504, 508 or 510, then the cursor is manipulated or a tool tip is surfaced to indicate a hot spot zone following entry point C at block 412 in FIG. 4.

Figure 6:
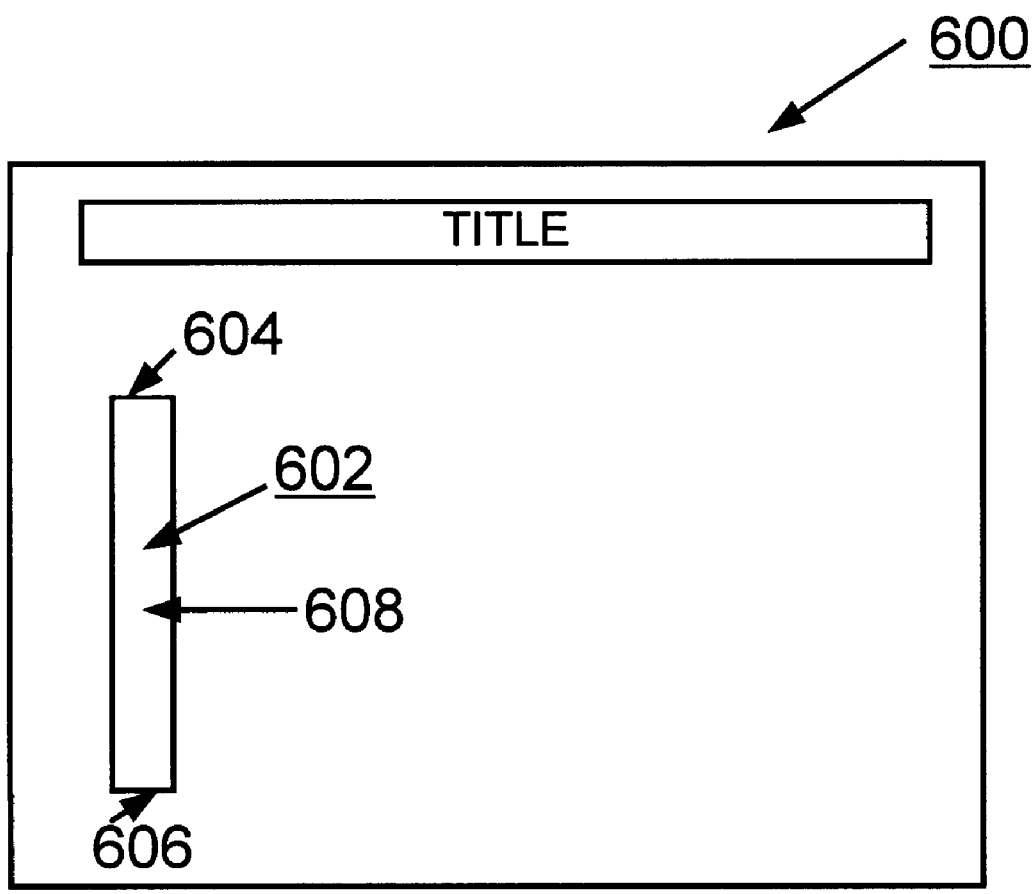
FIG. 6 illustrates an exemplary screen display with a graphical user interface (GUI) draggable windows control including multiple hot spots in accordance with the preferred embodiment.

Referring now to FIG. 6, there is shown an exemplary screen display 600 illustrating graphical user interface (GUI) draggable windows control 602 in accordance with the preferred embodiment. The draggable windows control 602 includes a top hot spot generally designated by the reference character 604, a bottom hot spot generally designated by the reference character 606 and a middle hot spot generally designated by the reference character 608. Top and bottom hot spot s 604 and 606 and the middle hot spot 608 are dynamically changed based upon the size of the control 602 so that the user is enabled to more easily manipulate a control.

Figure 7:
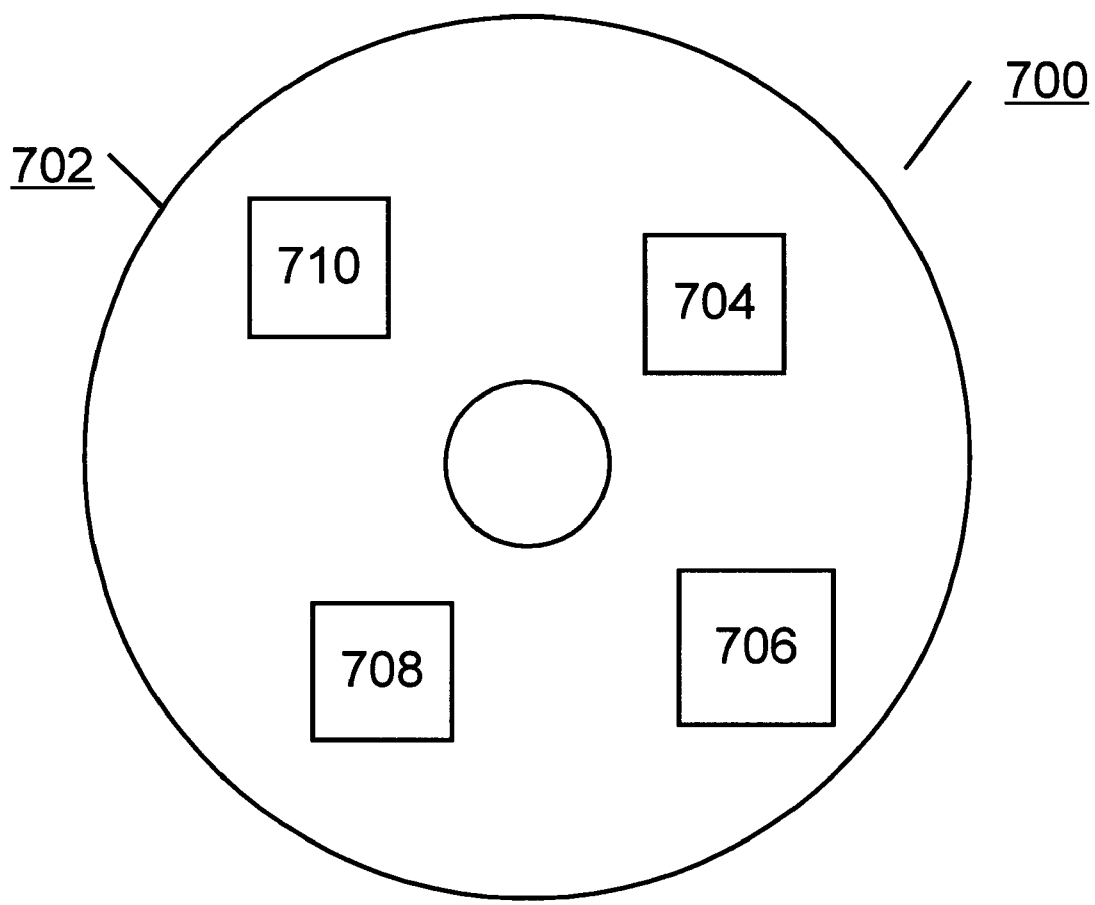
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for dynamically changing hot spots on a draggable windows control of the preferred embodiment in the system 100 of FIG. 1.

A sequence of program instructions or a logical assembly of one or more interrelated modules defined by the recorded program means 704, 706, 708, 710, direct the computer system 100 for dynamically changing hot spots on a draggable windows control of the preferred embodiment.

While the present invention has been described with reference to the details of the embodiments of the invention shown in the drawing, these details are not intended to limit the scope of the invention as claimed in the appended claims.

What is claimed is:

1. A computer implemented method for dynamically changing hot spots on a draggable windows control comprising the steps of:
   determining a size of a control;
   comparing the control size with a predetermined minimum size;
   responsive to the control size being less than said predetermined minimum size, calculating top and bottom hot spots beyond ends of the control for stretch hot spots and on the control for move hot spot; and
   responsive to the control size being greater than or equal to said predetermined minimum size, calculating a ratio for determining said top and bottom stretch hot spots.

2. A computer implemented method for dynamically changing hot spots on a draggable windows control as recited in claim 1 further includes the steps of waiting for a mouse movement activity.

3. A computer implemented method for dynamically changing hot spots on a draggable windows control as recited in claim 2 further includes the steps of responsive to said mouse movement activity, comparing the control size with a predetermined minimum size.

4. A computer implemented method for dynamically changing hot spots on a draggable windows control as recited in claim 3 further includes the steps of responsive to the control size being less than said predetermined minimum size, checking for a mouse position beyond a top end of the control.

5. A computer implemented method for dynamically changing hot spots on a draggable windows control as recited in claim 4 further includes the steps responsive to said mouse position beyond top end of the control, of selecting a top hot spot.

6. A computer implemented method for dynamically changing hot spots on a draggable windows control as recited in claim 4 further includes the steps of responsive to the control size being less than said predetermined minimum size, checking for a mouse position beyond a bottom end of the control.

7. A computer implemented method for dynamically changing hot spots on a draggable windows control as recited in claim 6 further includes the steps responsive to said mouse position beyond said bottom end of the control, of selecting a bottom hot spot.

8. A computer implemented method for dynamically changing hot spots on a draggable windows control as recited in claim 6 further includes the steps responsive to said mouse position not beyond said top and bottom ends of the control, of selecting a middle hot spot.

9. A computer implemented method for dynamically changing hot spots on a draggable windows control as recited in claim 3 further includes the steps of responsive to the control size being greater than or equal to said predetermined minimum size, checking for a mouse position in a top zone of the control.

10. A computer implemented method for dynamically changing hot spots on a draggable windows control as recited in claim 9 further includes the steps responsive to said mouse position in said top zone of the control, of selecting a top hot spot.

11. A computer implemented method for dynamically changing hot spots on a draggable windows control as recited in claim 9 further includes the steps of responsive to the control size being greater than or equal to said predetermined minimum size, checking for a mouse position in a bottom zone of the control.

12. A computer implemented method for dynamically changing hot spots on a draggable windows control as recited in claim 11 further includes the steps responsive to said mouse position in said bottom zone of the control, of selecting a bottom hot spot.

13. A computer implemented method for dynamically changing hot spots on a draggable windows control as recited in claim 11 further includes the step responsive to said mouse position not in said top and bottom zones of the control, of selecting a middle hot spot.

14. A computer implemented method for dynamically changing hot spots on a draggable windows control as recited in claim 1 further includes the step of manipulating cursor to indicate a hot spot zone.

15. A computer program product for dynamically changing hot spots on a draggable windows control, said computer program product including a plurality of computer executable instructions stored on a computer readable medium, wherein said instructions, when executed by said computer system, cause the computer system to perform the steps of:

determining a size of a control;

comparing the control size with a predetermined minimum size;

responsive to the control size being less than said predetermined minimum size, calculating top and bottom hot spots beyond ends of the control for stretch hot spots and on the control for move hot spot; and responsive to the control size being greater than or equal to said predetermined minimum size, calculating a ratio for determining said top and bottom stretch hot spots.

16. A computer program product for dynamically changing hot spots on a draggable windows control as recited in claim 15 further includes the steps of waiting for a mouse movement activity; and responsive to said mouse movement activity, comparing the control size with a predetermined minimum size.

17. A computer program product for dynamically changing hot spots on a draggable windows control as recited in claim 15 further includes the step responsive to the control size being less than said predetermined minimum size, of checking for a mouse position beyond a top end and a bottom end of the control.

18. A computer program product for dynamically changing hot spots on a draggable windows control as recited in claim 15 further includes the steps of responsive to the control size being greater than or equal to said predetermined minimum size, of checking for a mouse position in a top zone and a bottom zone of the control.

19. A computer system having apparatus for dynamically changing hot spots on a draggable windows control comprising:

a processor, a memory;

a display;

a bus connecting said processor, said memory and said display, a dynamic hot spot changing program, said dynamic hot spot changing program performing the steps of:

determining a size of a control;

comparing the control size with a predetermined minimum size;

responsive to the control size being less than said predetermined minimum size, calculating top and bottom hot spots beyond ends of the control for stretch hot spots and on the control for move hot spot; and responsive to the control size being greater than or equal to said predetermined minimum size, calculating a ratio for determining said top and bottom stretch hot spots.

* * * * *